April 21, 1964     F. J. BOBRYK     3,129,734
POWER DRIVEN CHUCK AND ROTARY SAW BIT THEREFOR
Filed March 11, 1960     3 Sheets-Sheet 1
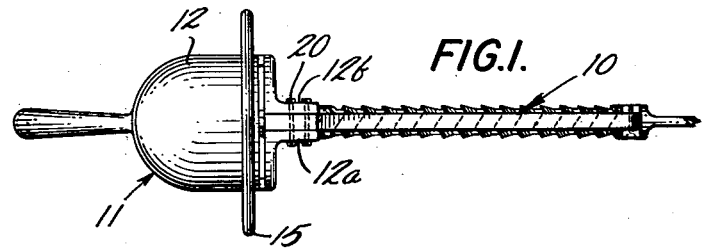
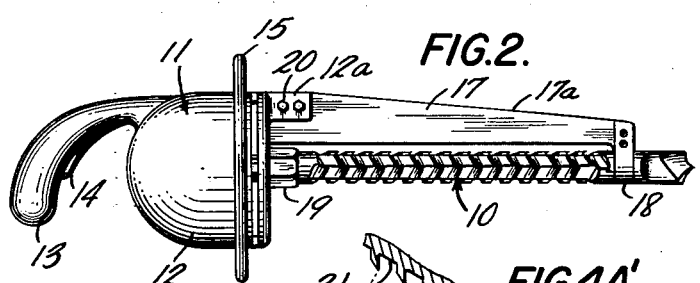
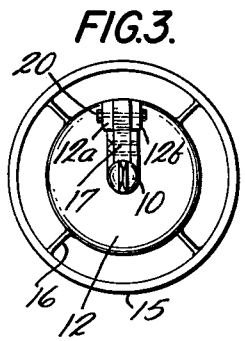
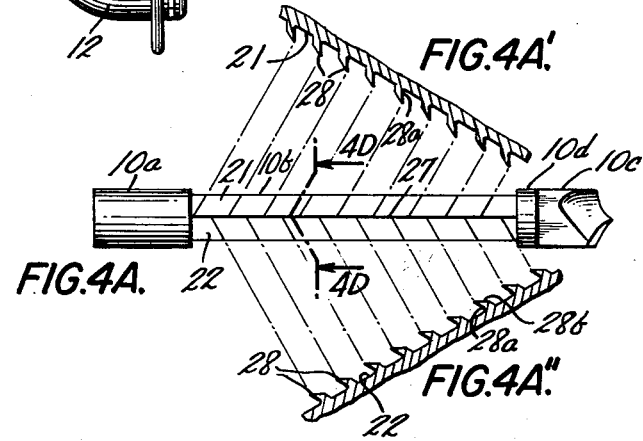
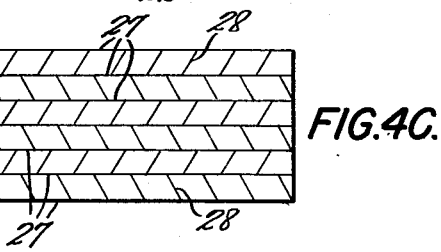
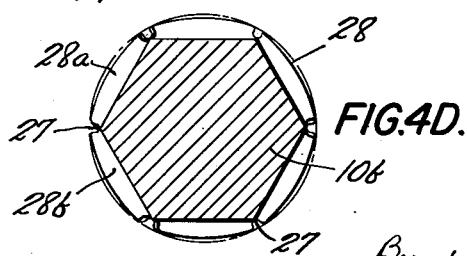
INVENTOR
FRANK J. BOBRYK
his ATTORNEYS April 21, 1964　　　F. J. BOBRYK　　　3,129,734
POWER DRIVEN CHUCK AND ROTARY SAW BIT THEREFOR
Filed March 11, 1960　　　　　　　　　　　3 Sheets-Sheet 2
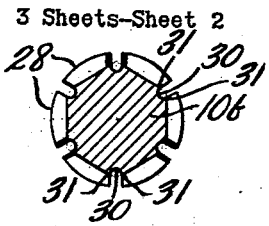
FIG.5A.
FIG.5B.
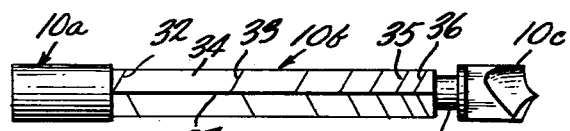
FIG.6.
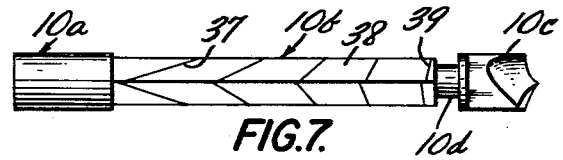
FIG.7.
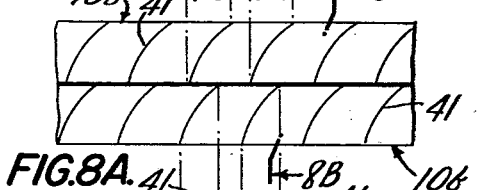
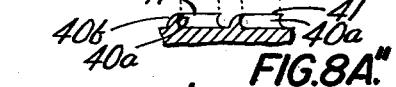
FIG.8A.
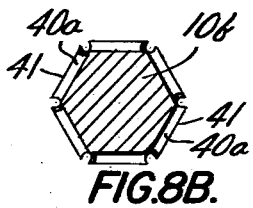
FIG.8B.
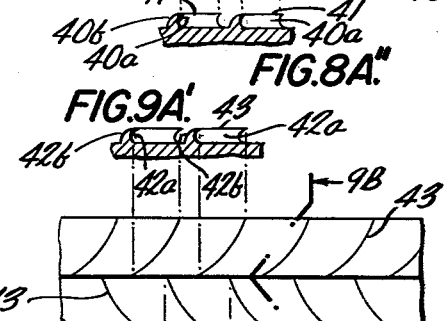
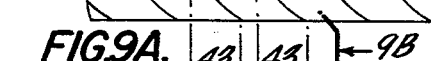
FIG.9A.
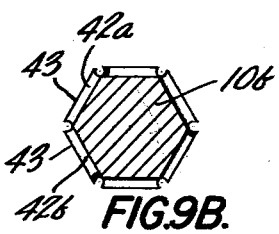
FIG.9B.
INVENTOR
FRANK J. BOBRYK
BY
Brumbaugh, Free, Graves & Donohue
his ATTORNEYS April 21, 1964 F. J. BOBRYK 3,129,734
POWER DRIVEN CHUCK AND ROTARY SAW BIT THEREFOR
Filed March 11, 1960 3 Sheets-Sheet 3
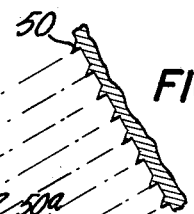
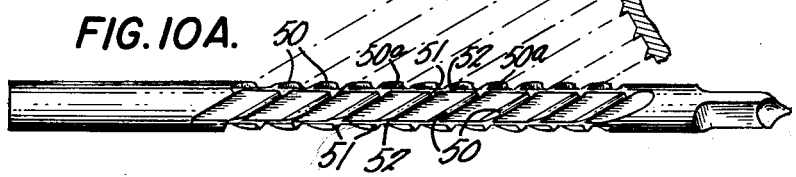
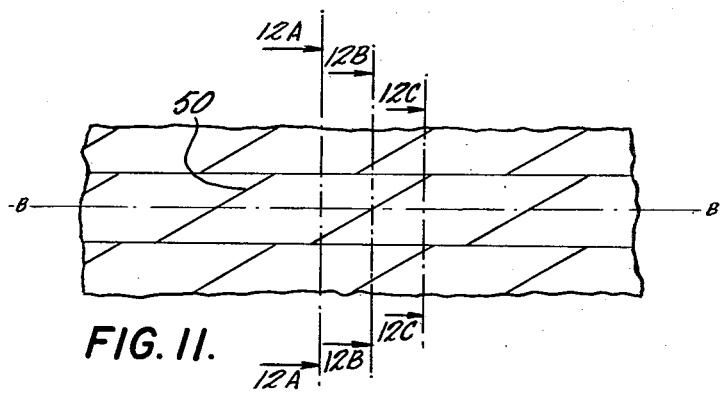
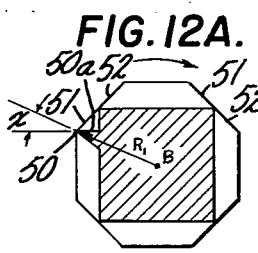
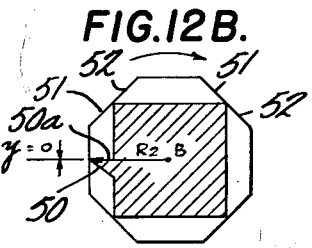
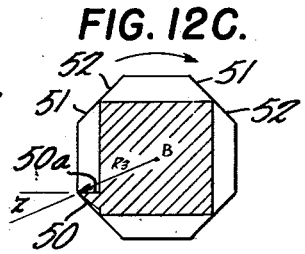
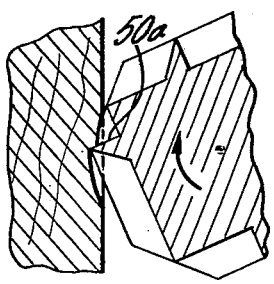
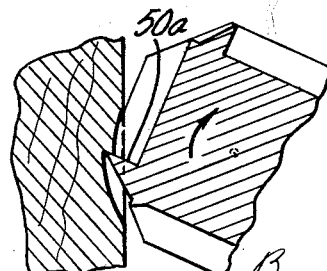
INVENTOR.
FRANK J. BOBRYK
BY
his ATTORNEYS.

United States Patent Office 3,129,734
Patented Apr. 21, 1964

3,129,734
POWER DRIVEN CHUCK AND ROTARY
SAW BIT THEREFOR
Frank J. Bobryk, 35 Boswell St., Stratford, Conn.
Filed Mar. 11, 1960, Ser. No. 14,462
14 Claims. (Cl. 143—133)

This invention relates to improvements in rotary power-driven chucks and in rotary cutting tools or bits therefor of the type capable of cutting a slot or path through a workpiece. The application is a continuation-in-part of the application of Frank J. Bobryk, Serial No. 637,197, filed January 30, 1957, now abandoned.

Heretofore, various proposals have been made for rotary tools or bits which are adapted to be inserted in conventional electrical drills or chucks and which are designed to saw when moved against a workpiece in a direction perpendicular to the axis of rotation thereof. Such rotary sawing tools have met with moderate success, but thus far, the performance and effectiveness thereof have left much to be desired. For one thing, conventional electrical drills are designed primarily for movement in the direction of the axis of the rotary bit. Accordingly, conventional electrical drills are not readily manipulated under pressure in directions radially of the axis of rotation of the bit. In addition, when pressure is applied in a plane radially of or perpendicular to the axis of rotation of the rotary bit, there is a tendency for the bit, particularly the lower end thereof, to deflect, which tendency not only impedes the cutting performance of the rotary bit, but also tends to throw the rotary chuck out of alignment. Then, too, the rotary sawing bits heretofore proposed have been less efficient and durable than could be desired. For example, heretofore the rotary bits proposed have been in the form of cylindrical shanks having continuous helical teeth or edges formed thereon, or cylindrical bits having individual teeth projecting from the outer periphery thereof. In both, the effieciency of the cutting or sawing action is very poor and, in the case of the latter, there is a tendency of the tool to vibrate or chatter, or of the teeth to become stripped, when held in contact with the edge of the workpiece.

The principal objects of the present invention are to provide an easily manipulated power-driven chuck and a durable rotary sawing tool or bit usable in this type of power-driven chuck, or in a different type, wherein the rotary tool or bit is capable of cutting a slot or path in a workpiece in the desired direction without substantial vibration or chattering.

In the rotary saw bit of the present invention, the cutting edges or teeth are arranged in longitudinal rows with the front faces thereof extending diagonally to a plane passing through the axis of rotation of the saw bit. Because of the unique arrangement of the cutting teeth of the rotary saw bit of the present invention, the front face of the leading end of each cutting tooth encounters the surface of the workpiece to be cut initially at an angle which permits the cutting edge to gradually find its way into the surface to be cut. As the saw bit rotates the surface of the workpiece encounters a changing front face angle of the tooth which varies from the leading end of tooth to the trailing end of the tooth. This arrangement of teeth provides an effective and smooth cutting action by virtue of its ability to initiate the cut gradually at the leading end of the cutting tooth while the trailing end of the tooth scoops out a chip with a sharp efficient cutting action.

Another feature of the rotary saw bit of the present invention is the provision of depth-limiting surfaces at the leading and trailing ends of the cutting teeth to limit the depth of cut.

For a more complete understanding of the present invention, reference may be made to the detailed description which follows, and to the accompanying drawings, in which:

FIGURE 1 is a top plan view of an electrical power drill or chuck equipped with one form of rotary bit embodying the present invention;

FIGURE 2 is a side elevation of the apparatus shown in FIGURE 1;

FIGURE 3 is an end view thereof;

FIGURE 4A is an illustrative view of one form of rotary sawing bit embodying the present invention;

FIGURES 4A' and 4A" are projected cross-sectional views of FIGURE 4A illustrating the cutting teeth;

FIGURE 4B is an end view of the bit shown in FIGURE 4A;

FIGURE 4C is an unrolled view showing the faces of the bit of FIGURE 4A in the same plane;

FIGURE 4D is a sectional view taken along the line 4D—4D of FIGURE 4A, looking in the direction of the arrows, to avoid showing any of the teeth in section;

FIGURE 5A is an illustrative view of another form of the rotary sawing bit of the present invention;

FIGURE 5B is a sectional view taken along the line 5B—5B of FIGURE 5A, looking in the direction of the arrows, to avoid showing any of the teeth in section;

FIGURE 6 is an illustrative view of a form of the bit similar to that illustrated in FIGURE 4A, except that the teeth on each face of the tool are unequally spaced thereon;

FIGURE 7 is an illustrative view of a form of the bit similar to that shown in FIGURE 4A, except that the angles of the teeth on a given face of the tool change progressively from one end toward the other;

FIGURE 8A is a view similar to FIGURE 4A of another embodiment of the rotary saw bit;

FIGURES 8A' and 8A" are projected views of FIGURE 8A showing the teeth in section;

FIGURE 8B is a sectional view taken along the line 8B—8B of FIGURE 8A, looking in the direction of the arrows, to avoid showing any of the teeth in section;

FIGURE 9A is a view similar to FIGURE 4A of still another embodiment of the tool;

FIGURES 9A' and 9A" are projected views of FIGURE 9A showing the teeth in section;

FIGURE 9B is a cross-sectional view taken along the line 9B—9B of FIGURE 9A, looking in the direction of the arrows;

FIGURE 10A is a view of still another form of the rotary saw bit of the present invention;

FIGURE 10A' is a projected view of FIGURE 10A showing the teeth in section;

FIGURE 10B is an end view of the rotary saw bit shown in FIGURE 10A;

FIGURE 11 is a fragmentary, schematic unrolled view of one longitudinal row of the cutting teeth of the rotary saw bit shown in FIGURE 10A;

FIGURES 12A, 12B and 12C are cross-sectional views taken along the lines 12A, 12B and 12C, respectively, of FIGURE 11 looking in the direction of the arrows;

FIGURE 13A is a cross-sectional view of the rotary saw bit shown in FIGURE 10A illustrating the cutting action of the leading end of the tooth; and FIGURE 13B is a view similar to FIGURE 13A, but illustrating the cutting action of the trailing end of the tooth.

Referring to FIGURES 1 to 3 of the drawings, the rotary sawing tool or bit 10 of the present invention is capable of being attached to a power-driven apparatus 11 of special design. The apparatus may be driven electrically or by a combustion engine. In its preferred form, the apparatus 11 comprises a housing 12 which accommodates an electric motor, a rotatable chuck 19 driven by the motor, a handle 13 equipped with a trigger type switch 14, a circular ring 15 surrounding the housing 12 and mounted thereto by radial spokes 16, a relatively flat guide blade 17 attached at one end to the housing 12 and extending generally parallel to the axis of the rotary cutter 10, and a bearing collar 18 carried at the extreme end of the guide blade 17 opposite the housing 12.

The rotary sawing tool or bit 10, as shown more clearly in FIGURES 4A to 4D, inclusive, comprises an end portion 10a which is received within the rotating chuck 19, an elongated polyfaced shank 10b having a plurality of teeth formed thereon, an axial boring drill 10c at the tip opposite the end 10a, and a circular journal portion 10d intermediate the portions 10b and 10c which rotates within the bearing collar 18.

In use, the power-driven chuck can be maneuvered conveniently by grasping the handle 13 with one hand and the annular ring 15 with the other. By this means, contrary to a conventional electrical drill, the power-driven chuck can be moved with relative ease in opposition to any resistance offered by the workpiece in directions radial or perpendicular to the axis of rotation of the chuck and bit, as well as in the direction of the axis thereof. When the outer periphery of the rotating bit or tool 10 is brought into engagement with the edge of a workpiece or surface to be cut, the tool is of such design as to effectively saw a slot or path through the workpiece, in much the same fashion as an ordinary saw blade. The power-driven chuck is so held and manipulated that the guide blade 17 trails the slot or path which is being cut. In order to facilitate the movement of the blade in the slot and to insure adequate clearance therefor, the thickness of the blade is less than the width of the slot or path cut. The width of the blade between the longitudinal edges thereof should be sufficient to permit it to serve as a guide for cutting a straight path or slot, but it should not be so wide as to prevent a change in direction of the tool, such as would be necessary to permit the cutting of a slot at an angle or a curve. Since at some times a wider blade is more advantageous than at other times, it has been found desirable to taper the trailing longitudinal edge 17a of the blade so that one end of the bit may be used when it is desired to take advantage of the wider end of the guide for cutting a straight path, and the other end of the bit can be used when it is desired to take advantage of the narrower end of the guide for changing the direction of cut. Also, the widest portion of the bearing collar 18 in a plane perpendicular to the direction of movement of the bit is equal to or less than the width of the slot or kerf cut by the bit so that the bearing collar can be moved through or within the slot or kerf.

It is, of course, obvious that in addition to serving as a guide to facilitate the cutting of a straight slot, the guide 17 also serves to support the bearing collar 18 and thereby reduces deflection of the bit 10, particularly when pressure is exerted to urge it against the edge or surface to be cut.

In some instances, the guide blade 17 may be in the way. For example, if a slot defining a right angle or an acute angle is to be formed in a workpiece, the blade may hinder the operation. Accordingly, the blade is detachably mounted to the housing 12. More specifically, as best shown in FIGURE 1, the face of the housing 12 which accommodates the chuck 19 is slotted to receive the edge of the guide blade and, in addition, a pair of blade-mounting brackets 12a and 12b extend outwardly from the face to receive the blade therebetween. Screws 20 pass through aligned holes in the mounting brackets 12a and 12b and in the blade 17 to permit the blade to be securely held thereto, as well as to be readily detached therefrom.

Turning now to a more detailed description of the rotary saw bit of the present invention, it should be understood that the bit can be used in various types of power-driven chucks, in addition to the type above described.

One embodiment of the rotary saw bit of the present invention is illustrated in FIGURES 4A, 4B, 4C and 4D of the drawings. In that embodiment, the toothed shank portion 10b is polyfaced so that when viewed endwise or in section (see FIGURE 4D) the projected faces of the shank defining the roots of the cutting edges or teeth define an equilateral polygon. The polygon configuration in this particular embodiment is a hexagon, forming faces 21, 22, 23, 24, 25 and 26. The longitudinal boundaries of each of these faces are formed by the longitudinal edges 27. Moreover, each of the faces has formed thereon a plurality of cutting edges or teeth 28 which extend at an angle to a plane normal to the axis of rotation of the bit.

In the embodiment shown in FIGURES 4A to 4D, inclusive, the diagonal cutting edges or teeth on any given face of the bit are spaced apart equally in the longitudinal direction and are substantially parallel to each other. Moreover, the teeth formed on alternate sides are substantially parallel to each other, but the teeth formed on adjacent sides face in opposite directions and extend at equal angles of opposite hand. For example, referring to the projected profile views of the salient cutting edges or teeth 28, as shown in FIGURES 4A' and 4A", the front faces 28a of the teeth on adjacent faces of the shank portion 10b face in opposite directions, as do the rear faces 28b thereof. More specifically, the front faces 28a of the teeth on the side 21 face toward the drill end 10c of the tool, whereas the front faces 28a of the teeth of the adjacent side 22 face in the direction of the end 10a which is held in the chuck. This reversal in the direction of the teeth of adjacent faces of the bit, in combination with the reversal in the diagonal teeth of adjacent faces, provides a compensating effect which aids in preventing drifting movements of the saw bit.

From the foregoing description of the embodiment of the rotary bit described in FIGURES 4A to 4D, inclusive, it will be obvious that the unique polysided rotary saw bit of the present invention affords advantages in respect to the ease of manufacture thereof. For example, it is a relatively costly operation to form helical teeth on a bit or to form individual teeth thereon. However, in the case of the polysided tool of the present invention, it is possible to cut all of the teeth on one face thereof or in one longitudinal row in one operation merely by moving a cutting tool and the bit relative to each other diagonally. Therefore, because of the unique configuration of the rotary saw bit of the present invention, it can be made at a cost substantially less than the inferior bits heretofore available. However, more importantly, these teeth afford unexpected advantages in respect to the cutting or sawing action thereof, as will be explained below in connection with FIGURES 12A to 13B, inclusive.

Although the number of faces of the tool might be important in the cutting or sawing of a particular material, the number of faces is not otherwise necessarily critical. To obtain the advantages of the counterbalancing or compensating reaction forces discussed above by reversing the faces and by changing the angles of the teeth of adjacent faces, an even number of faces is preferred so that every other face may be identical. However, the more important advantages of the improved cutting or sawing action of the rotary bit of the present invention are obtainable even though all of the teeth face in the same direction and extend at identical angles, so that, if desired, the bit may have an odd number of faces.

An alternative embodiment of the invention is shown in FIGURES 5A and 5B. In this embodiment, the saw bit is substantially identical to the embodiment illustrated and described in FIGURES 4A to 4D, inclusive, except that longitudinal furrows or grooves 30 are formed intermediate the adjacent faces thereof. The furrows 30 are recesses defined between the edges 31, and they aid in the removal of the material which has been cut away from the workpiece.

FIGURE 6 illustrates an embodiment of the invention which is substantially identical to the embodiment illustrated in FIGURES 4A to 4D of the drawings, except that the teeth on a given face of the tool are unevenly spaced apart. More specifically, the teeth 32 and 33 of the face 34 are spaced further apart than the teeth 35 and 36 thereof. This will enable one end of the bit to cut more rapidly than the other end. A slower rate of cutting may be desirable in order to carefully control the length or direction of cut, especially where the end of the cut is being approached.

FIGURE 7 illustrates another embodiment of the invention which is generally similar to the embodiment illustrated in FIGURES 4A to 4D, inclusive, except that the diagonal angle of the teeth changes progressively from one end to the other. Thus, for example, the angle with respect to a plane normal to the axis of rotation of the tooth 37 at one end of the face 38 is greater than the corresponding angle of the tooth 39. This variation in the angles of the teeth on a given face affords a different cutting effect at one end of the tool than the other. Thus, the cutting characteristics of one end of the tool may be better for cutting one type of material, whereas, the characteristics at the other end may be better for a different type of material.

In the embodiment of the sawing tool illustrated in FIGURES 8A, 8A', 8A" and 8B, the cutting edges of the teeth are curved in concave fashion (as viewed in FIGURE 8A) and the front faces 40a are dished to define concave surfaces (as viewed in FIGURES 8A' and 8A"). In the embodiment shown in FIGURES 9A, 9A', 9A" and 9B, the cutting edges of the teeth are curved in convex fashion (as viewed in FIGURE 9A), and the front faces 42a are dished out to define concave surfaces (as viewed in FIGURES 9A' and 9A"). In these embodiments, just as in the embodiment illustrated and described in connection with FIGURES 4A to 4D, inclusive, the shank 10b is polyfaced and the teeth of adjacent faces are longitudinally offset.

In the embodiment of the rotary saw bit shown in FIGURES 10A and 10B, all of the teeth 50 face in the same direction and extend at identical diagonal angles to the axis of rotation of the bit. In addition, flats of 51 and 52 are formed at the leading and trailing ends, respectively, of each tooth to limit the depth of the cut. As shown in FIGURES 12A to 12C, inclusive, the surfaces 51 and 52 lie in the same plane, but they would be effective to limit the depth of cut even if they were in different planes or curved surfaces. These depth-limiting surfaces 51 and 52 are non-cutting surfaces which are integrated into the rotary bit to govern the maximum size of chip each tooth cuts and to help the bit to maintain its concentricity with the surface which is being cut.

The cutting action of the improved rotary saw bit of the present invention can be explained with reference to FIGURES 12A to 13B, inclusive, of the drawings. In a rotary saw bit in which the cutting teeth extend diagonally to a plane passing through the axis of rotation of the bit, the angle of the front face of each tooth encountered by the surface of the workpiece to be cut varies from the leading to the trailing ends of the tooth, notwithstanding the fact that the angle of the front face may remain constant with respect to the root surface of the bit; that is to say, the surfaces identified as 21, 22, 23, 24, 25 and 26 in the embodiment shown in FIGURES 4A to 4D, inclusive. For example, in the embodiment of the bit shown in FIGURE 10A, the angle of the front face of each tooth is shown as approximately perpendicular to its root surface, although the angle which is presented to the surface of the workpiece to be cut varies from a negative to a positive angle between the leading and trailing ends of the tooth. As the term is used herein, the *front face angle* is the angle defined between the front face viewed in cross-section taken on a plane perpendicular to the axis of rotation of the saw bit and a radial line passing through the axis of rotation B of the bit and the cutting edge of the tooth. In FIGURE 12A, the cross-section is taken at the leading end of the tooth and the front face angle $x$ defined between the face of the tooth and the line $R_1$ which passes through the axis of rotation B of the bit and the cutting edge of the tooth is negative. In FIGURE 12B, the cross-sectional view is taken intermediate the leading and trailing ends of the tooth and the front face angle $y$ defined by the radius line $R_2$ and the front face of the tooth is substantially zero. In FIGURE 12C, the cross-sectional view is taken at the trailing end of the tooth, and the angle defined by the front face and the radius line $R_3$ is positive. Thus, notwithstanding the fact that the angle of the front face of the tooth with respect to the root surface of the bit is constant throughout the length of each tooth, the *front face angle* which is encountered by the surface to be cut varies between the leading end of the tooth and the trailing end thereof, permitting the leading end of the tooth to find its way gradually into the surface to be cut (as shown in FIGURE 13A) while permitting the trailing end of the tooth to scoop out a chip with a sharp cutting action (as shown in FIGURE 13B).

In FIGURES 12A to 12C, inclusive, the front face of the tooth is shown as a planar surface for convenience. In the embodiments shown in FIGURES 8A to 9B, inclusive, of the drawings, the front faces of the teeth are curved so that for these purposes the *front face angle* at a given cross-section is determined by the radius line drawn through the axis of rotation and the cutting edge and the portion of the front face which lies immediately adjacent the cutting edge.

The invention has been shown in preferred forms and by way of example only, and obviously many variations and modifications may be made therein without departing from the spirit of the invention. The invention, therefore, is not to be limited to any specified form of embodiment, except insofar as such limitations are set forth in the claims.

I claim:

1. A rotary saw bit comprising a shank having a plurality of cutting teeth thereon arranged in longitudinal rows around the shank, said teeth having faces defined at least in part by an inner root and an outer cutting edge, the faces of said teeth extending at an angle to the axis of rotation of the saw bit, the roots of the teeth in any row lying in a plane, the angle defined between said plane and the face of a tooth adjacent said root being relatively uniform throughout the length of the face of the tooth from the leading end to the trailing end thereof so that, when viewed in cross-section on a plane perpendicular to the axis of rotation, the angle defined by the portion of the face adjacent the cutting edge and a radial line passing through the axis of rotation of the saw bit and the cutting edge of the tooth varies from the leading end of the tooth to the trailing end of the tooth, becoming a more positive angle toward the trailing end of the tooth.

2. A rotary saw bit as set forth in claim 1 including depth limiting surfaces intermediate the trailing ends of the teeth of one row and the leading ends of the teeth of an adjacent row to limit the depth of the cut.

3. A rotary saw bit as set forth in claim 1 in which the teeth are spaced apart in each longitudinal row to facilitate the flow of chips.

4. A rotary saw bit as set forth in claim 1 wherein the shank is provided with an even number of rows, the teeth of alternate rows being parallel.

5. A rotary saw bit as set forth in claim 1 in which the teeth of one longitudinal row and the teeth of another longitudinal row extend at angles to each other but at equal angles to the axis of rotation of the bit.

6. A rotary saw bit as set forth in claim 1 in which the cutting teeth of different longitudinal rows face toward opposite ends of the shank.

7. A rotary saw bit as set forth in claim 1 in which the cutting edges of adjacent longitudinal rows extend diagonally at equal angles of opposite hand to the axis of rotation of the bit, and in which the faces of the teeth of both longitudinal rows face in the direction of rotation of the bit.

8. A rotary saw bit as set forth in claim 1 in which the faces of the teeth in a longitudinal row are curved from their leading ends to their trailing ends.

9. A rotary saw bit as set forth in claim 1 in which the cutting faces of at least some of the teeth are curved from the cutting edge to the root and in which the angle which becomes more positive is measured between said radial line and the portion of the face of the tooth immediately adjacent the cutting edge.

10. A rotary saw bit as set forth in claim 1 in which planes in which the roots of the teeth lie define a polysided shank.

11. A rotary saw bit as set forth in claim 1 in which the faces of the teeth in a given row are substantially parallel.

12. A rotary saw bit as set forth in claim 1 in which the angle of a tooth to the axis of rotation of the saw bit at one end of the bit is different than the corresponding angle of a tooth at the other end of the bit so that different cutting actions are obained.

13. A rotary saw bit comprising a shank having a plurality of salient cutting teeth thereon arranged in longitudinal rows around the shank, said teeth having faces defined at least in part by an inner root edge and an outer cutting edge, said faces extending diagonally to the axis of rotation of the saw bit, the faces of the teeth in a given row being substantially parallel, said shank having a planar surface adjacent said root edge of the cutting tooth, the angle defined between said planar surface and the face of the tooth being relatively uniform throughout the length of the face of the tooth from the leading end to the trailing end thereof so that, when viewed in cross section on a plane perpendicular to the axis of rotation, the angle defined by the portion of the face adjacent the cutting edge and a radial line perpendicular to and passing through the axis of rotation of the saw bit and the cutting edge of the tooth varies from the leading end of the tooth to the trailing end of the tooth, becoming a more positive angle toward the trailing end of the tooth.

14. A rotary saw bit comprising a shank and a plurality of longitudinal rows of cutting teeth, the teeth in each row being in parallel relationship and extending diagonally to the axis of rotation of the saw bit, each tooth being defined by a root edge, a front face and a cutting edge, the root edges of the teeth in a longitudinal row lying in the same plane and being in parallel relationship, the planes of said root edges defining a polygon, the teeth being such that when viewed in cross-section on a plane perpendicular to the axis of rotation of the bit the angle defined between the portion of the front face of each tooth adjacent the cutting edge and a line passing through the axis of rotation of the saw bit and the cutting edge of the tooth varies from a negative angle at the leading end of the tooth to a positive angle at the trailing end of the tooth.

References Cited in the file of this patent

UNITED STATES PATENTS

| 2,158,444 | Wardle | May 16, 1939 |
| 2,238,578 | Burkeman | Apr. 15, 1941 |
| 2,437,669 | Adams | Mar. 16, 1948 |
| 2,623,552 | Compton et al. | Dec. 30, 1952 |
| 2,670,018 | Coates | Feb. 23, 1954 |
| 2,918,955 | Simas | Dec. 29, 1959 |